(12) United States Patent
Feltström et al.

(10) Patent No.: US 6,195,639 B1
(45) Date of Patent: Feb. 27, 2001

(54) MATCHING ALGORITHM FOR ISOLATED SPEECH RECOGNITION

(75) Inventors: Alberto Jimenez Feltström, Löberöd; Jim Rasmusson, Vellinge, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/322,150

(22) Filed: May 28, 1999

Related U.S. Application Data (60) Provisional application No. 60/134,225, filed on May 14, 1999.

(51) Int. Cl.$^7$ .............................. G01L 15/08; G01L 15/28

(52) U.S. Cl. .................... 704/252; 704/240; 704/236; 704/231; 704/247

(58) Field of Search ............................ 704/231, 236, 704/237, 239, 240, 251, 252, 255

(56) References Cited

U.S. PATENT DOCUMENTS

| | | | |
|---|---|---|---|
| 4,336,421 | * 6/1982 | Welch et al. | 704/243 |
| 4,896,358 | * 1/1990 | Bahler et al. | 704/257 |
| 5,459,798 | 10/1995 | Bailey et al. | . |
| 5,729,656 | * 3/1998 | Nahamoo et al. | 704/254 |
| 5,799,278 | 8/1998 | Cobbett et al. | . |
| 5,806,034 | 9/1998 | Naylor et al. | . |

FOREIGN PATENT DOCUMENTS

| | | |
|---|---|---|
| 0810583A | 12/1997 | (EP) . |
| 0903728A | 3/1999 | (EP) . |
| 2250188 | 10/1998 | (JP) . |

OTHER PUBLICATIONS

Fox, B.L., "Reducing the Number of Multiplications in Iterative Processes." ACTA INFORMATICA, vol. 3, No. 1, 1973, pp. 43–45.

Chen, Xixian et al., "On the Problem of In–Place Calculating LPC Parameters." 1991 IEEE International Symposium on Circuits and Systems, vol. 1, 1991, pp. 316–319.

Rabiner, Lawrence R., "A Tutorial on Hidden Markov Models and Selected Applications in Speech Recognition," Proceedings of the IEEE, vol. 77, No. 2, Feb. 1989, pp. 257–286.

Rabiner, Lawrence R., et al., "Theory of Implementation of Hidden Markov Models." Fundamentals of Speech Recognition, Prentice Hall, Englewood Cliffs, NJ, 1993. Chap. 6, pp. 321–389.

* cited by examiner

*Primary Examiner*—David R. Hudspeth
*Assistant Examiner*—Daniel A. Nolan
(74) *Attorney, Agent, or Firm*—Burns, Doane, Swecker & Mathis, L.L.P.

(57) ABSTRACT

The present invention provides a system and method for improving conventional, isolated word, speech recognition systems. According to exemplary embodiments of the present invention, a pattern matching algorithm is provided that permits an unknown speech signal to be recognized with fewer memory access operations compared to conventional techniques. The pattern matching algorithm performs multiple successive calculations on speech reference data retrieved from memory to thereby reduce the number of times that the same data is retrieved. By reducing the number of memory access operations, the throughput of the speech recognition system can be increased. As an alternative, the pattern matching algorithm allows for an increase in the size of the speech recognition system's vocabulary.

9 Claims, 5 Drawing Sheets

MATCHING ALGORITHM FOR ISOLATED SPEECH RECOGNITION

The present application claims priority from U.S. Provisional Application No. 60/134,225, filed May 14, 1999, the disclosure of which is incorporated by reference herein.

BACKGROUND

The present invention relates generally to speech recognition systems and, more particularly, to a system and method having reduced memory access requirements associated with the recognition of an isolated word.

Isolated speech recognition is a process in which an unknown spoken utterance (or word) is identified. Through a process known as training, signals representing known words are examined and features of the words are determined and recorded for use as recognition models (or patterns) in a speech recognizer memory. The recognition models represent typical acoustic renditions of known words. In the training process, a training algorithm is applied to the recognition models to form these stored representations that are used to recognize future unknown words.

Figure 1:
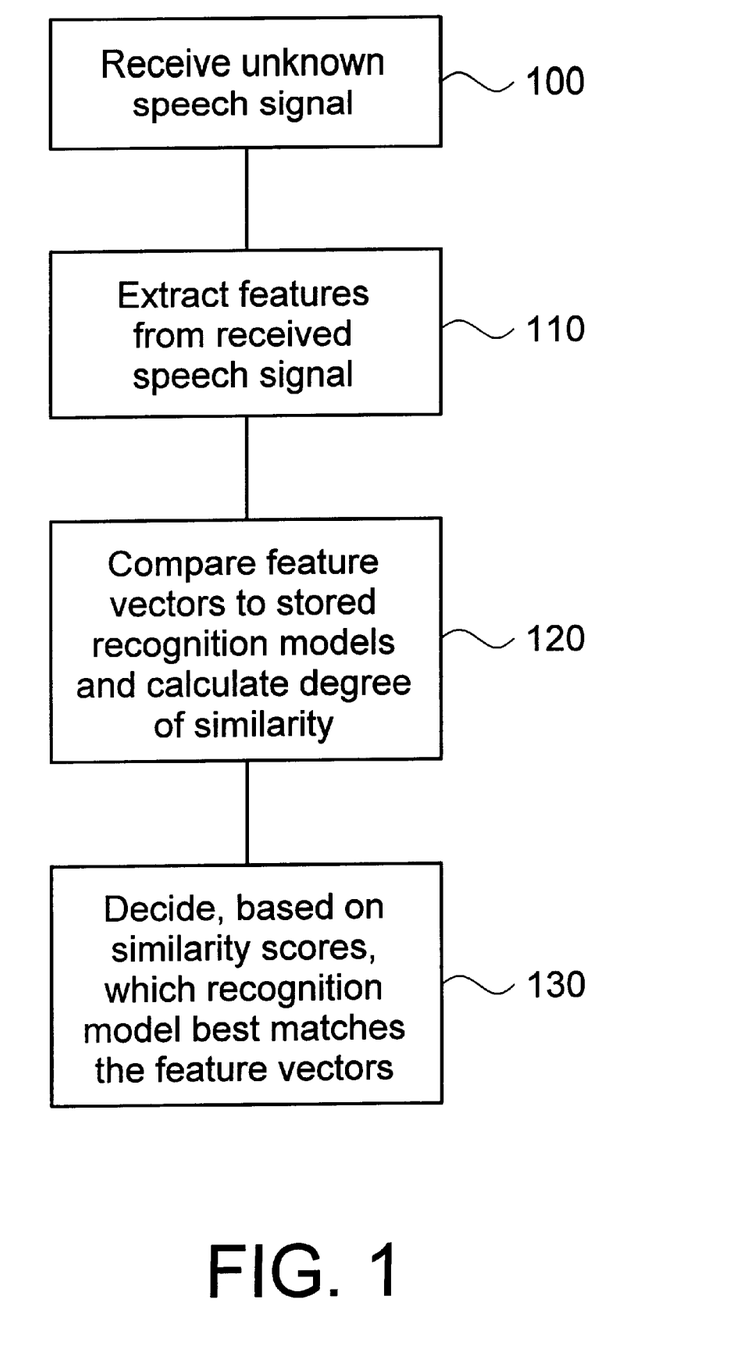
FIG. 1 illustrates a conventional speech recognition process.

Speech recognition is generally implemented in three stages, as illustrated in FIG. 1. In step 100, an unknown speech signal is received via, for example, a microphone and processed to produce digital data samples. In step 110, features that are based on a short-term spectral analysis of the unknown speech signal are determined at predetermined time intervals. As will be appreciated, these features, commonly called "feature vectors," are usually the output of some type of spectral analysis technique, such as a filter bank analysis, a linear predictive coding analysis, or a Fourier transform analysis. In step 120, the feature vectors are compared to one or more of the recognition models that have been stored during the above-described training process. During this comparison, the degree of similarity between the feature vectors and recognition models is computed. Finally, in step 130, the speech recognizer determines, based on the recognition model similarity scores, the recognition model that best matches the unknown speech signal. The speech recognizer then outputs the word corresponding to the recognition model having the highest similarity score.

Most of today's speech recognizers are based on the Hidden Markov Model (HMM). As will be appreciated, the HMM provides a pattern matching approach to speech recognition as described in detail in "A Tutorial on Hidden Markov Models and Selected Applications in Speech Recognition," by Lawrence R. Rabiner, Proceedings of the IEEE, Vol. 77, No. 2, February 1989, pp. 257–286, the entirety of which is incorporated by reference herein.

An HMM is generally defined by the following elements:

1. The number of states in the model, N;
2. The state-transition matrix $$A = \begin{bmatrix} a_{11} & a_{12} & \cdots & a_{1N} \\ a_{21} & a_{22} & & \vdots \\ \vdots & & \ddots & \\ a_{N1} & \cdots & & a_{NN} \end{bmatrix},$$

where $a_{ij}$ is the probability of the process moving from state $q_i$ to state $q_j$ at time t=1, 2, etc. and given that the process is at state $q_i$ at time t−1;

3. The observation probability distribution, $$b_i(\vec{o}), i=1, \ldots, N \text{ for all states } q_i, i=1, \ldots, N;$$

and

4. The initial state probability $\pi_i$ for i=1, 2, ..., N.

The Viterbi algorithm is commonly used in HMM speech recognizers to perform the comparison and decision operations described in FIG. 1. The Viterbi algorithm may quite simply be stated as: given the observations $\vec{o}_t$, t=1, 2, ..., T, where T is the duration of the detected speech measured in number of feature vectors, find the most probable state sequence for each model in the vocabulary and choose the model with the highest probability. The following represents a conventional pattern matching algorithm for performing this task.

For every speech model $\lambda_m$, where m=1, ..., M, the following processes are performed:

Pre-processing:

$$\tilde{\pi}_i = \log(\pi_i), \quad 1 \leq i \leq N$$
$$\tilde{b}_i(\vec{o}_t) = \log(b_i(\vec{o}_t)), \quad 1 \leq i \leq N, 1 \leq t \leq T$$
$$\tilde{a}_{ij} = \log(a_{ij}) \quad 1 \leq i, j \leq N$$

Initialization:

$$\tilde{\delta}_1 = \tilde{\pi}_1 + \tilde{b}_i(\vec{o}_1), \quad 1 \leq i \leq N$$

Recursion:

$$\tilde{\delta}_t(j) = \max_{1 \leq i \leq N} \left[\tilde{\delta}_{t-1}(i) + \tilde{a}_{ij}\right] + \tilde{b}_j(\vec{o}_t), 2 \leq t \leq T, 1 \leq j \leq N$$

Termination:

$$\tilde{P}_m^* = \max_{1 \leq i \leq N} \left[\tilde{\delta}_T(i)\right]$$

where the score $\tilde{\delta}_t(j)$ is an approximation of the logarithm of the probability for the most probably path passing node j at the time t and $\tilde{P}_m^*$ is the logarithm of the probability for the most probably path ending at node N at time T. The recognition result (i.e., the word to which the unknown speech signal corresponds) is $\hat{\lambda}=\lambda_m$, where $$m = \arg\max_{m} \max_{1 \leq m \leq M} \tilde{P}_m^*.$$

The above-described conventional pattern matching algorithm has four stages, namely, a pre-processing stage, an initialization stage, a recursion stage and a termination stage. In the pre-processing stage, logarithmic values of the initial state probability $\pi_i$ for i=1, ..., N, the description of the feature probability distribution $b_i(\vec{o}_t)$ where $1 \leq i \leq N$ and $1 \leq t \leq T$, and the state-transition probabilities $a_{ij}$, where $i \geq 1$ and $j \leq N$, are computed and stored in memory. The function $b_i(o)$ and the values of the initial state probability $\pi_i$ and the state-transition probabilities $a_{ij}$ generally depend upon the particular speech model λm being considered. However, in order to decrease the amount of data describing the models, some of the constants are set to be equal regardless of the model. For example, the initial state probabilities are often set to $\pi_1=1$, $\pi_i=0$ when i>1 for all the speech models. These logarithmic values that are determined during the pre-processing stage are generally computed and stored during the "training" of a speech recognizer. It will be appreciated that, in those situations where the value of a particular probability is equal to zero, the following convention will be used log (0)=–∞. Since the pre-processing stage is performed once and saved, the cost of this processing stage to most systems is negligible.

In the initialization stage, the path scores $\delta_t(j)$ is calculated at time 1 for state i, where $1 \leq i \leq N$. This calculation involves fetching the logarithmic values of the state-transition probabilities au and the description of the function $\tilde{b}_j(o)$ for j=1. In the recursion stage, the score $\delta_t(j)$ is calculated for state i, ranging from 1 to N, at time t, where $2 \leq t \leq T$, and state j, where $1 \leq j \leq N$. It will be appreciated that the first score calculation is determined for t=2 and state j ranging from 1 to N. Since the value of j changes for each calculation, the description of the function $\tilde{b}_j(o)$ also changes for each calculation. As such, a memory fetch operation is performed for each calculation involving a different j value in order to retrieve the appropriate description of the function $\tilde{b}_j(o)$. The value of t is then incremented to 3 and the score is calculated for state j ranging from 1 to N. It is evident from this calculation that memory accesses in the order of $O(N^2)$ are performed during this stage for each model m.

Finally, during the termination stage, the highest probability result (or best path score) for each specific model is determined from the calculations obtained in the recursion stage. An overall best path score is obtained by comparing the best path scores obtained for each model m. Additional information regarding the above-described conventional algorithm can be found in "Fundamentals of Speech Recognition," by Lawrence R. Rabiner et al., Prentice Hall, 1993, pp. 321–389, which is incorporated by reference herein.

Looking closely at the recursion operation described above, it is apparent that memory accesses in the order $O(MN^2)$ are needed for each time interval t from 2 to T. Often, the so-called Bakis model (or left-right model) is used which requires that $a_{ij}=0 j<i$, and $j>i+\Delta$, where $\Delta$ represents the maximum number of states that can be jumped in moving along a single path. If the Bakis model is used, the number of memory accesses needed for the above-described algorithm is reduced to the order of $O(M\Delta N)$.

Figure 2:
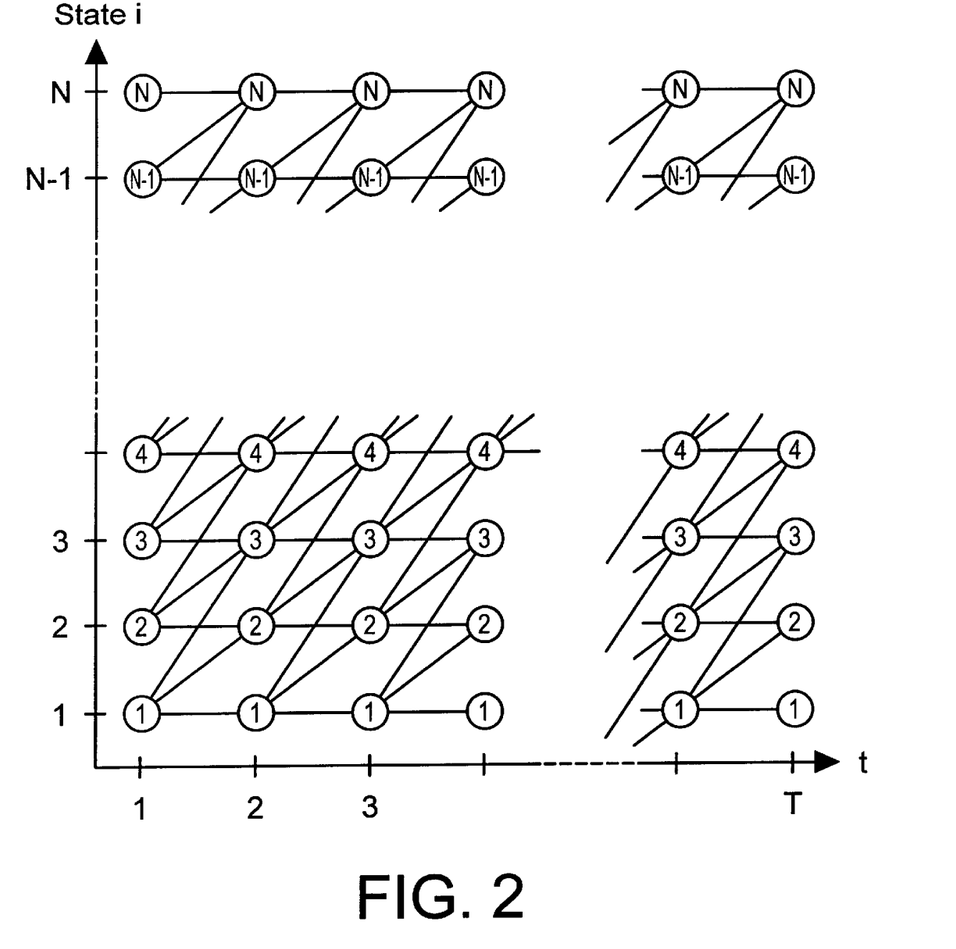
FIG. 2 illustrates the order in which the highest probable path is calculated for a conventional pattern matching algorithm.

FIG. 2 illustrates the order in which calculations are performed for a speech recognizer using the Bakis model with $\Delta=2$. Each time instant t in FIG. 2 may correspond to a time instant when the feature extraction unit is delivering feature vectors. As illustrated, one $$\delta_t(j) = \max_{1 \leq i \leq N} [\delta_{t-1}(i) + \tilde{a}_{ij}] + \tilde{b}_j(\vec{o}_t)$$

calculation is performed at each node, starting at time 2, state 1, to time 2, state N. Each calculation involves, inter alia, one or more memory access operations in order to retrieve the necessary data stored during the pre-processing stage. The calculations and memory access operations are then performed for the node at time 3, state 1 to the node at time 3, state N. These calculations and memory access operations continue for all nodes, ending at the node at time T, state N.

It will be appreciated that designers of speech recognition systems desire the presence of a large vocabulary size since a large vocabulary size allows the speech recognition system to match an input speech signal to a greater number of words. However, a large vocabulary size often requires that the speech reference data (i.e., the data used in the recursion stage of the above-described pattern matching algorithm) be stored in external memory. It is well established that accesses to external memory are slower than accesses to a system's internal memory. As such, it is desirable to limit the number of external memory access operations since a large number of external memory access operations can lead to intolerable delays.

There exists a need for a system and method for reducing the number of external memory access operations in speech recognition systems compared to conventional techniques.

SUMMARY

The present invention provides a system and method for improving conventional, isolated word, speech recognition systems. According to exemplary embodiments of the present invention, a pattern matching algorithm is provided that permits an unknown speech signal to be recognized with fewer memory access operations compared to conventional techniques. The pattern matching algorithm performs multiple successive calculations on speech reference data retrieved from memory to thereby reduce the number of times that the same data is retrieved. By reducing the number of memory access operations, a slow memory and, therefore, a memory of lower cost can be used. As an alternative, the pattern matching algorithm allows for an increase in the size of the speech recognition system's vocabulary.

BRIEF DESCRIPTION OF THE DRAWINGS

The above objects and features of the present invention will be more apparent from the following description of the preferred embodiments with reference to the accompanying drawings, wherein.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 3:
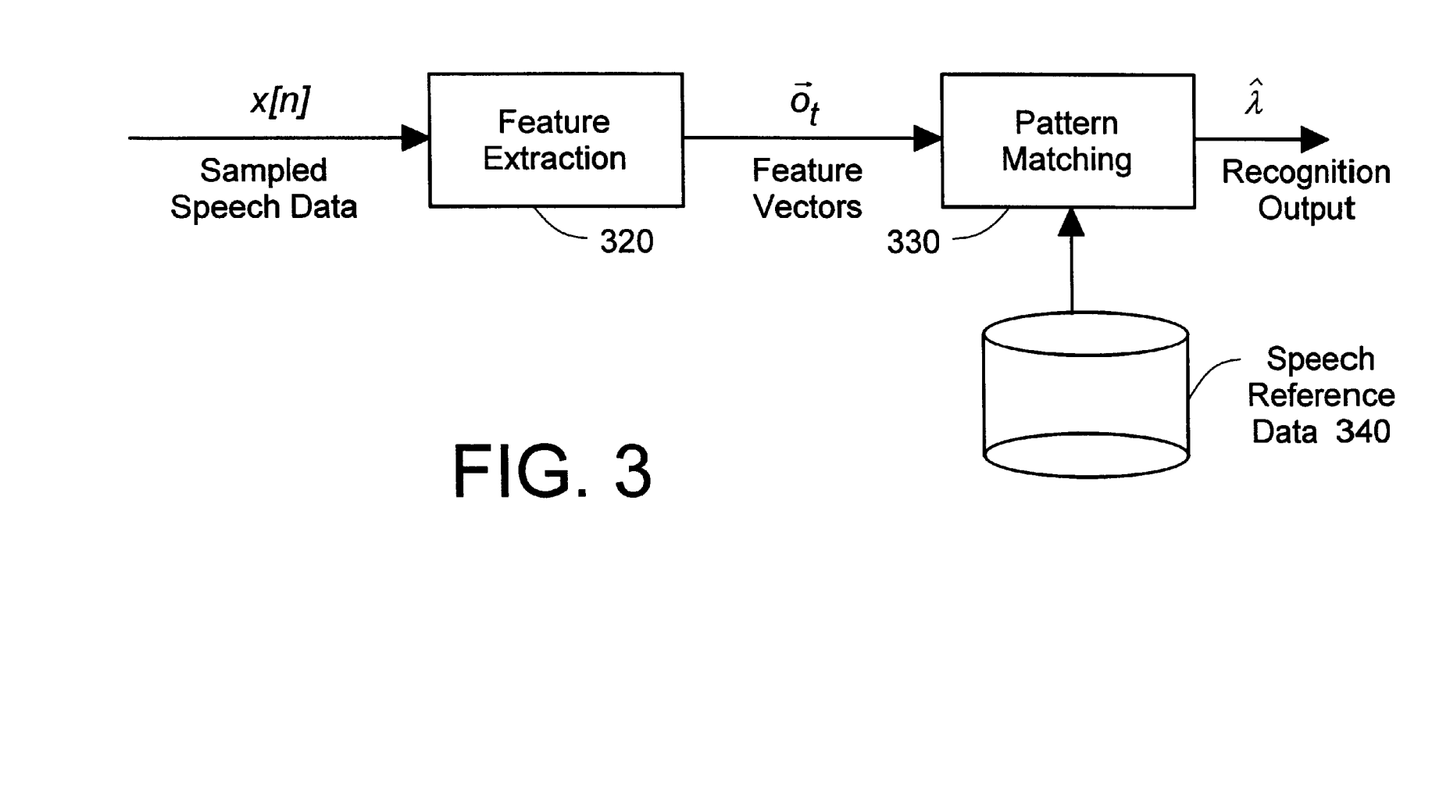
FIG. 3 illustrates an exemplary speech recognition system in which the pattern matching algorithm of the present invention may be employed.

FIG. 3 illustrates a block diagram of an exemplary, isolated word, speech recognizer into which the pattern matching algorithm of the present invention may be implemented. It will be appreciated that the present invention may be implemented in any processing environment having at least one processing unit and some type of means for receiving sampled speech data.

As illustrated in FIG. 3, the exemplary, isolated word, speech recognizer comprises a feature extraction unit 320, a pattern matching unit 330, and a memory device 340 for storing speech reference data. In operation, a speech signal, sampled typically at an 8 kHz sampling rate and denoted by x[n], is fed to the feature extraction unit 320. The feature extraction unit 320 provides a parametric representation of the speech signal. Conventional techniques such as employment of a filter bank, Fourier transformation or linear predictive coding analysis are used to obtain the parameters. Such techniques are described, for example, in "Fundamentals of Speech Recognition," Lawrence R. Rabiner et al., Prentice Hall, 1993. A sequence of feature vectors constituting, for example, an observation sequence $\vec{o}_t$, is built. Typically, these feature vectors (or observation sequence $\vec{o}_t$) are fed to the pattern matching unit 330 every 5–20 ms although the actual rate will depend on the requirements of the particular embodiment being implemented.

In the pattern matching unit 330, the most likely spoken word that corresponds to the input speech signal is found by searching and matching, in a finite size vocabulary 340 of size M, the recognition result $\hat{\lambda} \in \{\lambda_1, \lambda_2, \ldots, \lambda_M\}$. As described above, this searching and matching operation is performed through the use of a pattern matching algorithm. The present invention recognizes that the number of memory access operations required to implement this searching and matching operation can be reduced by a factor q over the conventional pattern matching algorithm by performing multiple highest path probability (or best path score) calculations utilizing the same speech reference data. Depending on the particular embodiment, the reduction factor $\eta$ may range from 2 to T.

The following example illustrates the various features of the present invention. For sake of simplicity and without loss of generality, it is assumed that $\eta=2$ and the Bakis model is used with $\Delta=2$. Under such assumptions, the pattern matching algorithm of the present invention can be represented as illustrated below.

For every speech model $\lambda_m, \ldots, M$, the following processes are performed:

Preprocessing:

$$\tilde{\pi}_i = \log(\pi_i), \quad 1 \leq i \leq N$$

$$\tilde{b}_i(\vec{o}_t) = \log(b_i(\vec{o}_t)), \quad 1 \leq i \leq N, 1 \leq t \leq T$$

$$\tilde{a}_{ij} = \log(a_{ij}) \quad 1 \leq i, j \leq N$$

Initialization:

$$\tilde{\delta}_1 = \tilde{\pi}_1 + \tilde{b}_i(\vec{o}_1), 1 \leq i \leq N$$

Recursion:

$$\tilde{\delta}_{t-1}(j) = \max_{1 \leq i \leq j}\left[\tilde{\delta}_{t-2}(i) + \tilde{a}_{ij}\right] + \tilde{b}_j(\vec{o}_{t-1}),$$

$$\tilde{\delta}_t(j) = \max_{1 \leq i \leq j}\left[\tilde{\delta}_{t-1}(i) + \tilde{a}_{ij}\right] + \tilde{b}_j(\vec{o}_t), 1 \leq j \leq N, t = 3, 5, 7, \ldots, T$$

Termination: $\tilde{P}_m^* = \max_{1 \leq i \leq N}\left[\tilde{\delta}_T(i)\right]$ The recognition result is $\hat{\lambda} = \lambda_m$, where $$m = \arg\max_m \max_{m \leq M} \tilde{P}_m^*.$$

Figure 4:
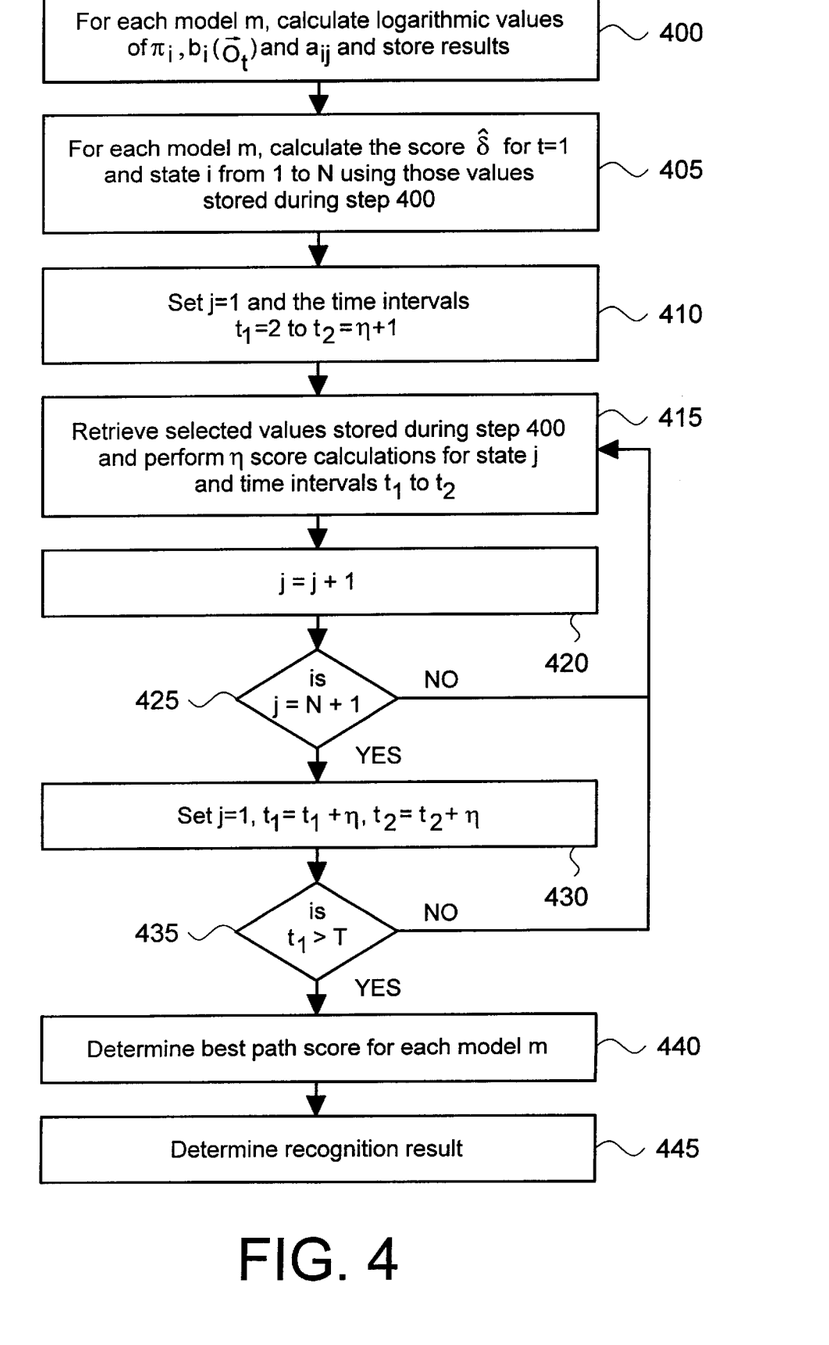
FIG. 4 illustrates the pattern matching algorithm according to exemplary embodiments of the present invention.

FIG. 4 illustrates the operation of the pattern matching algorithm of the present invention. Similar to the conventional pattern matching algorithm set forth above, the pattern matching algorithm of the present invention comprises four stages: a pre-processing stage, an initialization stage, a recursion stage and a termination stage. In the pre-processing stage, which is represented by step 400, logarithmic values of the initial state probability $\pi_i$ for $i=1, \ldots, N$, the description of the feature probability distribution $\tilde{b}_i(\vec{o}_t)$ where $1 \leq i \leq N$ and $1 \leq t \leq T$, and the state probabilities $\tilde{a}_{ij}$, where $i \geq 1$ and $j \leq N$, are computed and stored in memory. As indicated above, this stage is generally performed during the training process of a speech recognizer.

In the initialization stage (step 405), a score calculation is performed for time interval 1 and state i ranging from 1 to N. This score calculation involves the retrieval of the logarithmic values of the initial state probabilities that were calculated and stored during the pre-processing stage and the description of the function $\tilde{b}_j(o)$, where $j=1, \ldots, N$, from memory. The function $\tilde{b}_j(o)$ provides an indication of how well the feature vectors compare to the feature vector that would have been generated by a HMM staying on state j. If it is assumed, as is generally the case, that the speech recognizer comprises M different processors that simultaneously execute the pattern matching algorithm, then this score calculation can be simultaneously performed for each speech model m, where m ranges from 1 to M.

The recursion stage includes steps 410–435. In the recursion stage, the value of state j is set equal to 1 and the time intervals, $t_1$ to $t_2$, for which score calculations will be performed, are initially set at $t_1=2$ and $t_2=\eta+1$ (step 410). In step 415, selected logarithmic values (e.g., the state-transition probabilities $\tilde{a}_{ij}$) that were stored during the pre-processing stage are retrieved from memory, along with the description of the functions $\tilde{b}_j(o)$, and $\eta$ score calculations are performed for state j at time intervals $t_1$ to $t_2$. In step 420, the value j is incremented by 1. If, in step 425, it is determined that the new value of j is less than the value N+1, then the algorithm returns to step 415 and $\eta$ score calculations are performed for this new value of j at the same time intervals $t_1$ to $t_2$. If, on the other hand, the value of j equals the value N+1, then step 430 is performed. In step 430, the value of j is again set equal to 1 and the time intervals $t_1$ and $t_2$ are incremented by the value $\eta$. That is, the value $t_1$ becomes the value $t_1+\eta$ and the value $t_2$ becomes the value $t_2+\eta$. It is then determined in step 435 whether the value of $t_1$ exceeds the total time T which is the duration of the detected speech measured in number of feature vectors. If $t_1 \leq T$ (i.e, the end of the speech signal has not yet been detected), then the pattern matching algorithm returns to step 415 in order to calculate $\eta$ score values for the new time intervals. If it is determined that $t_1 > T$, then the pattern matching algorithm proceeds to the termination stage. Where a speech recognizer comprises M processors as described above, the above-described processes can be simultaneously performed for each of the models m.

In the termination stage, the best path score is determined for model $\lambda_m$, (step 440). In step 445, the recognition result is determined by considering all of the models 1-M and choosing an overall best path score.

It is evident from the pattern matching algorithm illustrated above that the recursion stage of the present invention is different from that of the conventional algorithm. The recursion stage of the pattern matching algorithm of the present invention performs η path score calculations in succession using the same speech reference data (i.e., data retrieved during the same memory access operation). As such, multiple path score calculations can be performed utilizing the same reference data without requiring subsequent accesses to the external memory to retrieve this data.

Figure 5:
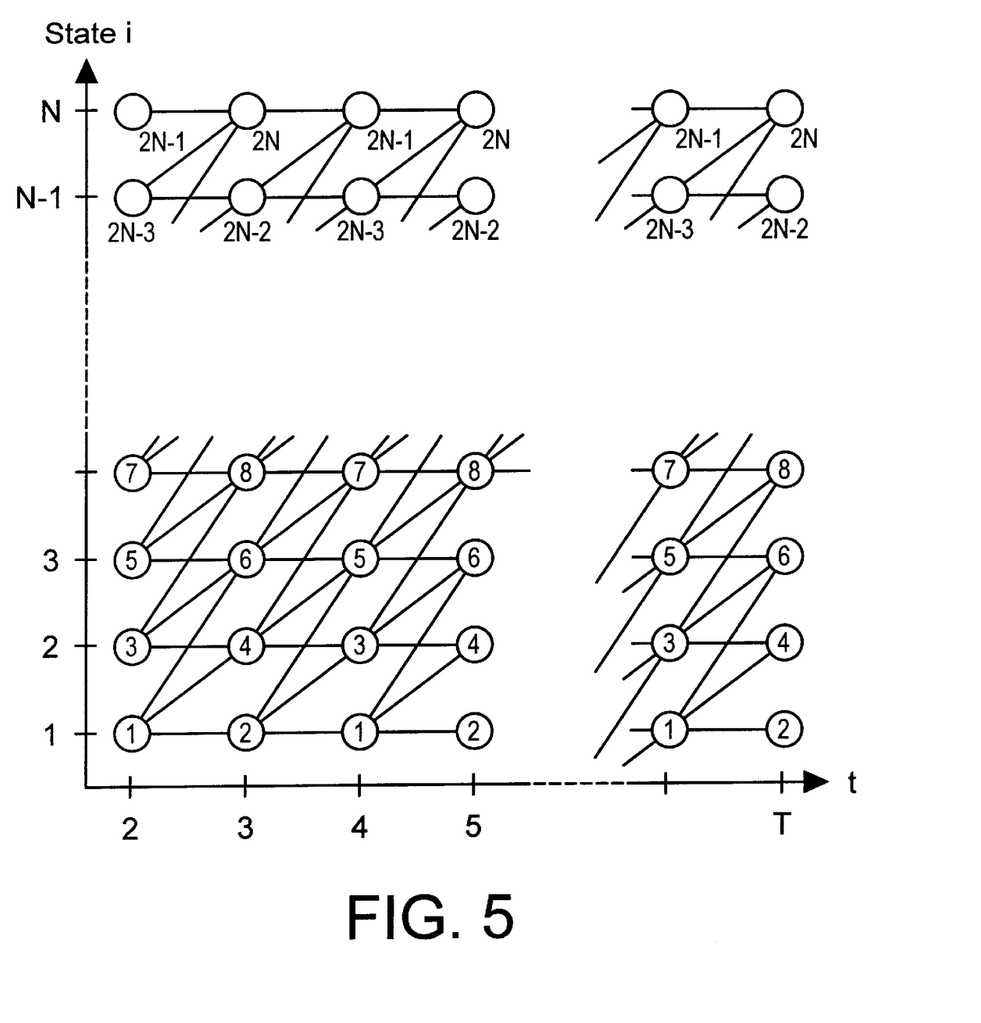
FIG. 5 illustrates the order in which the highest probable path is calculated for the pattern matching algorithm of the present invention, where a Bakis model with $\Delta=2$ and a memory access reduction factor $\eta=2$ is employed.

FIG. 5 illustrates the order, for the above-described example where η=2, in which the score is calculated for the recursion operation of the pattern matching algorithm of the present invention. As illustrated, two successive $$\tilde{\delta}_t(j) = \max_{1 \leq i \leq j}\left[\tilde{\delta}_{t-1}(i) + \tilde{a}_{ij}\right] + \tilde{b}_j(\vec{o}_t)$$

calculations are performed in every recursion operation using the same model data. For example, a memory access operation and two path score calculations are performed for the nodes at state 1 and time t=2 and time t=3. A memory access operation and score calculations are then made for the nodes at state 2 and time t=2 and time t=3. As such, the score calculations are performed for the nodes in the first two columns, the second two columns, etc. It will be appreciated that, by performing two successive score calculations using the same data retrieved during a single memory access operation, the number of memory access operations is two times less than that required by the conventional pattern matching algorithm.

By reducing the number of memory access operations, the throughput of the speech recognizer can be increased. The pattern matching algorithm of the present invention may alternatively, as will be appreciated by one skilled in the art, allow for the size of the vocabulary in a real-time speech recognizer to be increased without the use of expensive memory devices. This an important issue in low-cost speech recognizers. Moreover, by allowing for the size of the speech recognizer's vocabulary to be increased, the number of words that can be recognized by the system is increased. As a further alternative, the present invention allows system designers to use slower memory in order to reduce the cost of the speech recognizer and still be able to at least maintain the same processing speed as the prior art system.

While the reduction factor η was set equal to 2 in the above-described example, one skilled in the art will appreciate that the reduction factor can be set to any value, ranging from 2 to T. The delay due to a large η value is in general not a problem in modern computers. The delay depends on the number of operations per second that the processor can achieve. However, it will be appreciated that a large η value requires allocation of memory to store all η feature vectors. This might not be desired if T is too large.

The foregoing has described the principles, preferred embodiments and modes of operation of the present invention. However, the invention should not be construed as being limited to the particular embodiments discussed above. For example, while the above-described embodiments set forth the pattern matching of a speech signal, one skilled in the art will appreciate that the present invention is equally applicable to pattern matching of other types of signals. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method for identifying a pattern from a digitally sampled signal, said method comprising the steps of:

receiving said digitally sampled signal;

calculating predetermined variables using said digitally sampled signal and storing said variables in memory;

calculating a path score for a first time interval using one or more of said variables stored in memory;

retrieving selected ones of said variables from memory and performing η path score calculations at specific time intervals using said selected variables, where η is a number greater than or equal to 2, and wherein the η path scores $\delta_x(y)$ for state y at a time interval x are given by:

$$\tilde{\delta}_{t-(\eta-1)}(j) = \max_{\max(1, j-\mu) \leq i \leq j}\left[\tilde{\delta}_{t-\eta}(i) + \tilde{a}_{ij}\right] + \tilde{b}_j(\vec{o}_{t-(\eta-1)}),$$

$$\tilde{\delta}_t(j) = \max_{\max(1, j-\mu) \leq i \leq j}\left[\tilde{\delta}_{t-1}(i) + \tilde{a}_{ij}\right] + \tilde{b}_j(\vec{o}_t),$$

$$1 \leq j \leq N, t = 1 + \eta, 1 + 2\eta, 1 + 3\eta, \ldots, T$$

wherein:

μ is an integer that is set equal to a number of states used in a selected hidden Markov model;

$\tilde{a}_{ij}$ is a log of a probability of moving from a state $q_i$ to a next state $q_j$ at a particular time;

$\tilde{b}_j(\vec{o}_{t-1})$ is a log of a feature probability distribution for a feature vector, $\vec{o}_{t-1}$;

N is a total number of states; and

T is a total number of time intervals;

determining a best path score based on said calculated path scores for each of a plurality of models; and determining an overall best path score by comparing the best path scores of each of the plurality of models, wherein said digitally sampled signal is identified as a pattern of a model having the overall best path score.

2. The method of claim 1 wherein said digitally sampled signal is an audio signal.

3. The method of claim 1 wherein said selected variables comprise a set of state-transition probabilities and at least one of a group of function descriptions.

4. A system for identifying a pattern from a digitally sampled signal, said system comprising:

means for calculating predetermined variables using said digitally sampled signal and storing said variables in memory;

means for calculating a path score for a first time interval using one or more of said variables stored in memory;

mean for retrieving selected ones of said variables from memory and performing η path score calculations at specific time intervals using said selected variables, where η is a number greater than or equal to 2, and wherein the η path scores $\delta_x$(y) for state y at a time interval x are given by:

$$\tilde{\delta}_{t-(\eta-1)}(j) = \max_{\max(1,j-\mu) \leq i \leq j} \left[ \tilde{\delta}_{t-\eta}(i) + \tilde{a}_{ij} \right] + \tilde{b}_j(\vec{o}_{t-(\eta-1)}),$$

$$\vdots$$

$$\tilde{\delta}_t(j) = \max_{\max(1,j-\mu) \leq i \leq j} \left[ \tilde{\delta}_{t-1}(i) + \tilde{a}_{ij} \right] + \tilde{b}_j(\vec{o}_t),$$

$$1 \leq j \leq N, t = 1 + \eta, 1 + 2\eta, 1 + 3\eta, \ldots, T$$

wherein:
- $\mu$ is an integer that is set equal to a number of states in a selected hidden Markov model;
- $\tilde{a}_{ij}$ is a log of a probability of moving from a state $q_i$ to a next state $q_j$ at a particular time;
- $\tilde{b}_j(\vec{o}_{t-1})$ is a log of a feature probability distribution for a feature vector, $\vec{o}_{t-1}$;
- N is a total number of states; and
- T is a total number of time intervals;

means for determining a best path score based on said calculated path scores for each of a plurality of models; and means for determining an overall best path score by comparing the best path scores of each of the plurality of models, wherein said digitally sampled signal is identified as a pattern of a model having the overall best path score.

5. The system of claim 4 wherein said digitally sampled signal is an audio signal.

6. The system of claim 4 wherein said selected variables comprise a set of state-transition probabilities and at least one of a group of function descriptions.

7. A computer readable medium containing program instructions for:

calculating predetermined variables using a received digitally sampled signal and storing said variables in memory;

calculating a path score for a first time interval using one or more of said variables stored in memory;

retrieving selected ones of said variables from memory and performing η path score calculations at specific time intervals using said selected variables, where η is a number greater than or equal to 2, and wherein the η path scores $\delta_x$(y) for state y at a time interval x are given by:

$$\tilde{\delta}_{t-(\eta-1)}(j) = \max_{\max(1,j-\mu) \leq i \leq j} \left[ \tilde{\delta}_{t-\eta}(i) + \tilde{a}_{ij} \right] + \tilde{b}_j(\vec{o}_{t-(\eta-1)}),$$

$$\vdots$$

$$\tilde{\delta}_t(j) = \max_{\max(1,j-\mu) \leq i \leq j} \left[ \tilde{\delta}_{t-1}(i) + \tilde{a}_{ij} \right] + \tilde{b}_j(\vec{o}_t),$$

$$1 \leq j \leq N, t = 1 + \eta, 1 + 2\eta, 1 + 3\eta, \ldots, T$$

wherein:
- $\mu$ is an integer that is set equal to a number of states in a selected hidden Markov Model;
- $\tilde{a}_{ij}$ is a log of a probability of moving from a state $q_i$ to a next state $q_j$ at a particular time;
- $\tilde{b}_j(\vec{o}_{t-1})$ is a log of a feature probability distribution for a feature vector, $\vec{o}_{t-1}$;
- N is a total number of states; and
- T is a total number of time intervals;

determining a best path score based on said calculated path scores for each of a plurality of models; and determining an best overall path score by comparing the best path scores of each of the plurality of models, wherein said digitally sampled signal is identified as a pattern of a model having the overall best path score.

8. The computer readable medium of claim 7 wherein said digitally sampled signal is an audio signal.

9. The computer readable medium of claim 7 wherein said selected variables comprise a set of state-transition probabilities and at least one of a group of function descriptions.

* * * * *